United States Patent [19]

Meyer-Stoll et al.

[11] 3,839,265

[45] Oct. 1, 1974

[54] POLYMERIC COMPOSITION AND METHOD

[75] Inventors: Hans Albrecht Meyer-Stoll, Rheinkamp; Manfred Lottermoser, Barienrode, both of Germany

[73] Assignee: Deutsche Texaco Aktiengesellschaft, Hamburg, Germany

[22] Filed: Feb. 9, 1972

[21] Appl. No.: 224,927

[52] U.S. Cl............ 260/37 N, 164/43, 260/DIG. 40
[51] Int. Cl............................................. C08g 51/04
[58] Field of Search........... 260/51.5, 72.5, DIG. 40; 164/43

[56] References Cited
UNITED STATES PATENTS

| | | | |
|---|---|---|---|
| 2,349,756 | 5/1944 | Pratt | 260/72.5 X |
| 2,545,692 | 2/1951 | Gleim | 260/72.5 X |
| 3,403,721 | 10/1968 | Robins et al. | 260/DIG. 40 |
| 3,420,110 | 2/1969 | Walker et al. | 260/DIG. 40 |
| 3,616,046 | 10/1971 | Benzinger et al. | 260/51.5 X |

OTHER PUBLICATIONS

Chemical Abstracts, 62: 463e & 65: 7393f. (published 1963 and 1966 resp.)

J. H. Saunders and K C. Frisch, Polyurethanes, Chemistry and Technology, (1964) p. 301.

Primary Examiner—Allan Lieberman
Assistant Examiner—S. M. Person
Attorney, Agent, or Firm—T. H. Whaley; C. G. Ries

[57] ABSTRACT

A molding composition which is water cured to a polyurea bound material prepared by mixing between about 90 and 99 wt. percent sand and between about 1 and 10 wt. percent of a multifunctional isocyanate bonding agent which is the product of the phosgenation of the condensation product of an aldehyde and aromatic amine or an aldehyde, aromatic amine and a phenol.

9 Claims, No Drawings

POLYMERIC COMPOSITION AND METHOD

BACKGROUND OF INVENTION

It is known to mix quartz sand with aromatic diisocyanates and triisocyanates and solutions of phenolformaldehyde resin in which the phenol nuclei contain methylol groups and to transfer these mixtures into core boxes in which they are treated with triethylamine-containing inert gas, for example, with nitrogen containing triethylamine. The triethylamine acts as a catalyst in the reaction between the isocyanate groups and the methylol groups to form urethane groups. The polyurethane so formed binds the quartz sand together to produce solid mold parts which may be removed from the core boxes.

These polyurethane bonding agents formed by the foregoing method have the disadvantage in that the period of time in which sand mixtures thereof are workable is limited. The reaction resulting in the formation of the polyurethane starts during the mixing operation and before the triethylamine takes effect so that portions of the mixed molding batches have to be frequently discarded for reasons that they cannot be completely worked before the polyurethane forming reaction has progressed too far. An additional disadvantage of the aforementioned method of forming cores is the danger of exposure, poisoning and injury by cauterization in the handling of triethylamine and a triethylamine-inert gas mixture.

In order to reduce, though not completely to avoid these dangers, it has been proposed to use steam or water vapor or an aqueous aerosol instead of a triethylamine containing inert gas mixture to incorporate triethylamine or other tertiary amine in the sand mixture which contains the isocyanate and to employ polyesters instead of phenolformaldehyde resins. Water is supplied to assist the formation of the polyurea by the catalytic action of the tertiary amine present in the sand mixture and to assist the solidification of the foundry molded parts formed from the sand mixture. When this proposal was tested, it was found, however, that the properties of the sand mixtures of this kind undesirably changed very quickly immediately upon completion of the mixing operation and the desired solidifying effect was inadequate to enable moldable or even castable moldable parts to be produced.

THE INVENTION

It is an object of our invention to provide a molding mix in which need for the employment of tertiary amines is dispensed with and the dangers hereinbefore referred to are entirely avoided. Another object of the invention is to provide a molding mix in which the limitation of a short period of time in which the mix is usable is also avoided.

Specifically, the invention is directed to a molding composition which is cured by contact with water to a polyurea bound material, said molding composition comprising between about 90 and 99 wt. % sand and between about 1 and 10 wt. % of a multifunctional isocyanate binding agent formed by condensing an aldehyde of the formula RCHO with a member selected from the group consisting of (1) aromatic amine of the formula:

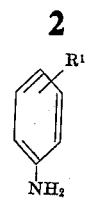

and (2) said aromatic amine and a phenol of the formula:

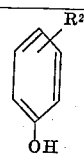

in a mole ratio of said amine to said phenol in said (2) of between about 0.08 : 1 and 0.8 : 1, where R and $R^1$ and $R^2$ are hydrogen or alkyl of from 1 to 6 carbons utilizing a mole ratio of aldehyde to said member of between about 1 : 1 and 1 : 3 advantageously employing a condensation temperature of between about 70° and 105°C. and a condensation period of between about 1 and 5 hours to form an aldehyde-member condensation product. The condensation product is contacted with phosgene utilizing a mole ratio of initial amine to phosgene of between about 1 : 0.1 and 1 : 1, advantageously at a temperature between about 30° and 130°C. normally for a period of between about 0.5 and 2.5 hours to form said multi-functional isocyanate binding agent.

Examples of the aldehydes contemplated herein are formaldehyde, acetaldehyde, glyoxal. Formaldehyde is the preferred aldehyde.

Examples of suitable aromatic amines contemplated herein are aniline, p-toluidine, m-toluidine, o-toluidine, o-nitraniline, m-nitraniline, p-nitraniline, o-phenylenediamine, m-phenylenediamine, p-phenylenediamine. Aniline is the preferred aromatic amine.

Examples of the phenols contemplated herein are monohydroxybenzene, o-, m-, p-methylphenol (cresols). Monohydroxybenzene is the preferred phenol.

In curing the sand condensation product compositions contemplated herein, the bonding agent-sand mixture is contacted with water vapor or steam wherein each mole of the water supplied reacts with two moles of the isocyanate groups formed in the phosgenation with the elimination of one mole of carbon dioxide and a simultaneous formation of (—HN—CO—NH) groups. This curing is normally conducted at a temperature between about 10° and 65°C. utilizing a mole ratio of water to initial aromatic amine of between about 0.5 : 1 and 5 : 1. Owing to the multiple functionality of the isocyanates, polyureas and polyurea derivatives are thus formed which impart the necessary solidity to the moldings with the resultant conversion of the moldings into solid foundry mold parts. Surprisingly, the structure of the moldings are not loosened by the evolving carbon dioxide. Further, the reaction between the water and the isocyanato groups proceeds relatively quickly and the use of tertiary amine catalyst is thus dispensed with. If required, the reaction may be accelerated by the application of heat, it being particularly advantageous for moldings to be treated with steam.

The multifunctional isocyanate bonding agents are, when too viscous, preferably used in the form of solutions, e.g., between about 10 and 80 wt. % solution in the mixing or preparation of the molding batches. Solvents used should be inert and have at least limited dissolving power for water, e.g., at least about 0.01 and 0.1 grams dissolved water per gram solvent. Suitable solvents are aromatic hydrocarbons, ketones, ethers, esters or mixtures which contain one or more of these classes of substances. Thus, for example, benzene, toluene, cyclohexanone and polyglycol ethers with esterified terminal hydroxide groups are representative of these classes of substances.

The invention is illustrated in the following examples but which are not to be construed as limitations thereof.

EXAMPLE I a. The bonding agent

Two hundred grams of phenol, 180 grams of a 38 wt. % aqueous formaldehyde solution and 100 grams of a 5 wt. % aqueous sodium hydroxide solution were boiled under reflux for 1 hour. The solution was then neutralized to a $p_H$ of about 7 with oxalic acid and 65 grams of aniline were added dropwise to the solution within a period of 30 minutes at reflux temperature (100°C.). The mixture was maintained at a reflux temperature for a further 3 hours. The aqueous phase was separated and the removal of the water was made complete by increasing the temperature to 135°C. Any unconverted aniline was simultaneously expelled. The brown resin obtained was dissolved as a 20 wt. % solution in a mixture of cyclohexanone, benzene, chlorobenzene and ortho-dichlorobenzene, and phosgene was bubbled therethrough. Ninety-seven grams of phosgene were introduced into the solution. Upon completion of phosgenation, a portion of the solution was removed and the solvent evaporated and the resultant multifunctional isocyanato bonding agent product was analyzed and found to have a chlorine content of about 2.5 wt. %. Solvent from the remainder of the phosgenated solution was evaporated until a 70 wt. % solution was formed which solution was then diluted with cyclohexanone to produce a 50 wt. % solution.

b. The molding composition and core composition

A molding batch was produced by mixing 4 kg. of dry quartz sand, 4 grams of calcium stearate and 160 grams of bonding agent described under (a). One portion of the molding batch was molded immediately after termination of the mixing operation, another portion being stored for 3 hours before it was molded. Six "bending rods" were molded from each batch as follows:

According to DIN 52404, a mold measuring (inside) 172.5 × 22.4 × 22.4 mm was filled with the resin-sand mixture, which was compressed by three blows with a ram exactly matching the mold and having a standard weight (6666 grams; DIN 52401). After termination of the ramming operation the molded part must have a height of 23.4 ± 0.3 mm. As distinct from DIN 52404 the rods were then left in the mold in order to be treated with steam or water vapor. The mold was also distinct from that used according to DIN 52404 in that it was provided with a funnel-shaped gas intake at the top and with slit nozzles or outlets on its underside. Steam admitted through the funnel-shaped gas intake was passed through the mix in the mold for a period of 2 minutes. The mold of the bending rods formed from each batch was completed immediately after the water vapor or steam had passed through and the rods were then stored for 1 hour before their bending strength was tested as follows:

The bending-test specimen was so disposed that both its ends rested on horizontal bending-test supports, with a width $L_S = 150$ mm between said supports, the axes of said supports being in a direction normal to the longitudinal axis of the bending-test specimen. A concentrated, vertical load was applied centrally to the specimen. The load was constantly and smoothly increased until the specimen broke. The indicated mean value is derived from three specimens; test values deviating by more than 10 percent from the mean value are discarded.

c. The results

The six rods tested in accordance with the above method and formed immediately upon termination of the mixing operation had an average bending strength of 19.5 kp/sq. cm. whereas the six rods formed from the molding batch that had been stored for 3 hours before water treatment had an average bending strength of 23.8 kp/sq. cm.

EXAMPLE II (not in accordance with the invention)

As the known commercial mixtures consist of two components only, 100 grams of a 40 wt. % phenol-novolak solution in cyclohexanone were mixed with 4 kg. of quartz sand, to which 40 grams of diisocyanatodiphenylmethane were added, and the whole was then intimately mixed. As described in Example I, six bending rods were molded immediately from the mixture in accordance with DIN 52404. As these mixtures cannot be cured with water vapor, an air stream loaded with triethylamine was passed, an usual, over the filled molds.

Results

The bending rods formed immediately after termination of the mixing operation showed an average bending strength of 28.3 kp/sq. cm. in accordance with DIN 52404, whereas the resin-sand mixture that had been stored for 3 hours had solidified and could no longer be utilized to form standard rods.

We claim:

1. A molding composition curable by treating with water consisting essentially of between about 90 and 99 wt. % sand and between 1 and 10 wt. % multifunctional isocyanate bonding agent prepared by condensing an aldehyde of the formula RCHO with a member selected from the group consisting of (a) an aromatic amine of the formula:

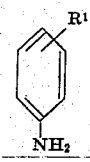

and (b) said aromatic amine and a phenol of the formula:

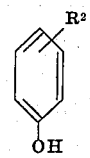

in a mole ratio of said aromatic amine to said phenol in (b) of between about 0.08 : 1 and 0.8 : 1, where R, $R^1$ and $R^2$ are hydrogen or alkyl of from 1 to 6 carbons to form an aldehyde-member condensation product and contacting said aldehyde-member product with phosgene utilizing a mole ratio of phosgene to said aromatic amine of between about 0.1 : 1 and 1 : 1 to form said multifunctional isocyanate bonding agent.

2. A composition in accordance with claim 1 wherein said member is (b), said aldehyde is formaldehyde, said aromatic amine is aniline, and said phenol is monohydroxybenzene.

3. A composition in accordance with claim 1 wherein said member is (a), said aromatic amine is aniline and said aldehyde is formaldehyde.

4. A method for producing a solid sand mold consisting essentially of contacting with water a composition comprising between about 90 and 99 wt. % sand and between about 1 and 10 wt. % multifunctional isocyanate bonding agent prepared by condensing an aldehyde of the formula RCHO with a member selected from the group consisting of (a) aromatic amine of the formula:

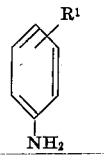

and (b) said aromatic amine and a phenol of the formula:

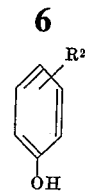

where R, $R^1$ and $R^2$ are hydrogen or alkyl of from 1 to 6 carbons to form an aldehyde-member condensation product and contacting said aldehyde-member condensation product with phosgene utilizing a mole ratio of phosgene to said aromatic amine of between about 0.08 : 1 and 0.8 : 1 to form said multifunctional isocyanate bonding agent.

5. A method for producing a solid sand mold in accordance with claim 4 wherein said member is (b), said aldehyde is formaldehyde, said aromatic amine is aniline, and said phenol is monohydroxybenzene.

6. A method in accordance with claim 4 wherein said member is (a), said aromatic amine is aniline and said aldehyde is formaldehyde.

7. A solid sand mold produced by the method of claim 4.

8. A solid sand mold produced by the method of claim 5.

9. A solid sand mold produced by the method of claim 6.

* * * * *